US012100289B2

(12) United States Patent
Candelore et al.

(10) Patent No.: US 12,100,289 B2
(45) Date of Patent: Sep. 24, 2024

(54) HEARING AID FOR ALARMS AND OTHER SOUNDS

(71) Applicant: Sony Group Corporation, Tokyo (JP)

(72) Inventors: Brant Candelore, Poway, CA (US); Mahyar Nejat, La Jolla, CA (US)

(73) Assignee: SONY GROUP CORPORATION, Tokyo (JP)

( * ) Notice: Subject to any disclaimer, the term of this patent is extended or adjusted under 35 U.S.C. 154(b) by 0 days.

(21) Appl. No.: 17/693,139

(22) Filed: Mar. 11, 2022

(65) Prior Publication Data

US 2023/0290232 A1 Sep. 14, 2023

(51) Int. Cl.
*H04R 25/00* (2006.01)
*G08B 3/10* (2006.01)

(52) U.S. Cl.
CPC ............ *G08B 3/10* (2013.01); *H04R 25/505* (2013.01); *H04R 2225/41* (2013.01)

(58) Field of Classification Search
CPC ..... G08B 3/10; H04R 25/505; H04R 2225/41
See application file for complete search history.

(56) References Cited

U.S. PATENT DOCUMENTS 4,777,474 A * 10/1988 Clayton .................. G08B 1/08 381/315
8,526,649 B2 * 9/2013 Foo ..................... H04R 25/554 381/315
2012/0169454 A1 7/2012 Petersen
2020/0296521 A1 9/2020 Wexler
2021/0006912 A1 1/2021 Van Gerwen
2021/0106236 A1 4/2021 Tran
2022/0021985 A1 * 1/2022 Wexler .................... G10L 25/51

OTHER PUBLICATIONS

Vivek, VS; Vidhya, S; Madhanmohan, P (2020). [IEEE 2020 International Conference on Communication and Signal Processing (ICCSP)—Chennai, India (2020.7.28-2020.7.30)] 2020 International Conference on Communication and Signal Processing (ICCSP)—Acoustic Scene Classification in Hearing aid using Deep Learning. , ( ), 0695-0699. doi:10.1109/ICCSP48568.2020.9182160.

* cited by examiner

*Primary Examiner* — Brian Ensey
(74) *Attorney, Agent, or Firm* — Trellis IP Law Group, PC

(57) ABSTRACT

A method for receiving an alarm sound at a hearing aid including the steps of: receiving sound at a hearing aid, wherein the sound is an alarm; determining a type of alarm; and generating a notification based on the type of alarm.

17 Claims, 6 Drawing Sheets

600

HEARING AID FOR ALARMS AND OTHER SOUNDS

CROSS REFERENCE TO RELATED APPLICATIONS

This application is related to U.S. patent application Ser. No. 17/693,142, entitled "HEARING AID IN-EAR ANNOUNCEMENTS," filed March 11, 2022, and U.S. patent application Ser. No. 17/693,145, entitled "HEARING AID FOR COGNITIVE HELP USING SPEAKER RECOGNITION," filed March 11, 2022, which are hereby incorporated by reference as if set forth in full in this application for all purposes.

BACKGROUND

Hearing aids assist users with hearing impairments by amplifying sounds to a level that the user can hear. Hearing aids typically detect ambient sounds and amplify all ambient sounds detected. However, it is possible that some sounds may still not be heard. For example, if the original sound is too faint, a hearing aid might not pick up the sound sufficiently to amply the sound to a level that the user can hear.

SUMMARY

Implementations generally relate to hearing aids. In some implementations, a system includes one or more processors, and includes logic encoded in one or more non-transitory computer-readable storage media for execution by the one or more processors. When executed, the logic is operable to cause the one or more processors to perform operations including: receiving sound at a hearing aid, where the sound is an alarm; determining a type of alarm; and generating a notification based on the type of alarm.

With further regard to the system, in some implementations, the generating of the notification is based on a degree of urgency. In some implementations, the logic when executed is further operable to cause the one or more processors to perform operations including providing the notification at a time based on a degree of urgency. In some implementations, the logic when executed is further operable to cause the one or more processors to perform operations including reproducing the alarm at a speaker of the hearing aid. In some implementations, the notification is a second alarm that is derived from the alarm. In some implementations, the notification is an audible message. In some implementations, the notification includes haptic feedback.

In some implementations, a non-transitory computer-readable storage medium with program instructions thereon is provided. When executed by one or more processors, the instructions are operable to cause the one or more processors to perform operations including: receiving sound at a hearing aid, where the sound is an alarm; determining a type of alarm; and generating a notification based on the type of alarm.

With further regard to the computer-readable storage medium, in some implementations, the generating of the notification is based on a degree of urgency. In some implementations, the instructions when executed are further operable to cause the one or more processors to perform operations including providing the notification at a time based on a degree of urgency. In some implementations, the instructions when executed are further operable to cause the one or more processors to perform operations including reproducing the alarm at a speaker of the hearing aid. In some implementations, the notification is a second alarm that is derived from the alarm. In some implementations, the notification is an audible message. In some implementations, the notification includes haptic feedback.

In some implementations, a method includes: receiving sound at a hearing aid, where the sound is an alarm; determining a type of alarm; and generating a notification based on the type of alarm.

With further regard to the method, in some implementations, the generating of the notification is based on a degree of urgency. In some implementations, the method further includes providing the notification at a time based on a degree of urgency. In some implementations, the method further includes reproducing the alarm at a speaker of the hearing aid. In some implementations, the notification is a second alarm that is derived from the alarm. In some implementations, the notification is an audible message.

A further understanding of the nature and the advantages of particular implementations disclosed herein may be realized by reference of the remaining portions of the specification and the attached drawings.

DETAILED DESCRIPTION

Implementations described herein enable and facilitate a user in hearing alarms and other sounds via a hearing aid. As described in more detail herein, in various implementations, a system receives sound at a hearing aid, where the sound is an alarm. The system further determines the type of alarm. The system further generates a notification for the user of the hearing aid based on the type of alarm.

Implementations enable the user to receive such notification in real-time as the user walks around at home or elsewhere (e.g., around town, etc.). In various implementations, the system provides in-ear notifications so that the user of the hearing aid hears the notification and other people in proximity do not hear the notifications. This discreetly notifies the user without disturbing other people or interrupting conversation between the user and others, etc.

Figure 1:
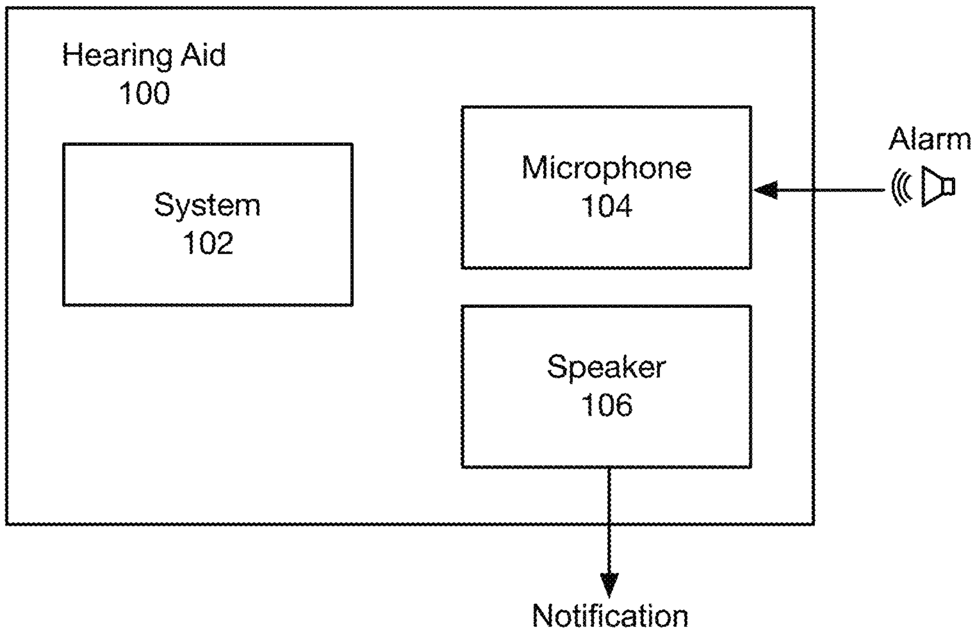
FIG. 1 is a block diagram of an example hearing aid and environment for enabling a user in hearing alarms and other sounds via a hearing aid, which may be used for implementations described herein.

FIG. 1 is a block diagram of an example hearing aid 100 and environment for enabling a user in hearing alarms and other sounds via a hearing aid, which may be used for implementations described herein. As shown, the environment includes hearing aid 100, which includes a system 102, a microphone 104, and a speaker 106.

In various implementations, system 102 of hearing aid 100 may communicate with the Internet directly or via a mobile device such as a smart phone, computer, etc. By enabling hearing aid 100 to be tethered to a mobile device that connects to the Internet or other network, hearing aid 100 may continually stream audio to the Internet for analysis by a web server. System 102 may communicate with the Internet or with another device such as a mobile device via any suitable communication network such as a Bluetooth network, a Wi-Fi network, etc.

As described in more detail herein, system 102 of hearing aid 100 receives outside sounds, which include various types of sounds from the ambient environment. The hearing aid 100 generally amplifies and/or may attenuate detected sounds according to implementations described herein. In various implementations, the sounds may include an alarm sound. In various implementations, system 102 provides a notification to a user wearing hearing aid 100. The notification may provide information about the alarm, such as the type of alarm, any urgencies associated with the alarm, etc.

In some implementations, system 102 attenuates detected sounds in order to enable the user wearing hearing aid 100 to better hear any alarm information provided by system 102. Further implementations directed to operations of hearing aid 100 are described in more detail herein, in connection with FIG. 4, for example.

For ease of illustration, FIG. 1 shows one block for each of system 102, microphone 104, and speaker 106. Blocks 102, 104, and 106 may represent multiple systems, microphones, and speakers, depending on the particular implementation. In other implementations, hearing aid 100 may not have all of the components shown and/or may have other elements including other types of elements instead of, or in addition to, those shown herein. Also, while some implementations are described herein in the context of a single hearing aid, these implementations also apply to multiple hearings. For example, in some scenarios, a user may wear a single hearing aid at one ear. In some scenarios, a user may wear a hearing aid at one ear and a second hearing aid at the other ear.

While system 102 performs implementations described herein, in other implementations, any suitable component or combination of components associated with system 102 or any suitable processor or processors associated with system 102 may facilitate performing the implementations described herein.

Figure 2A:
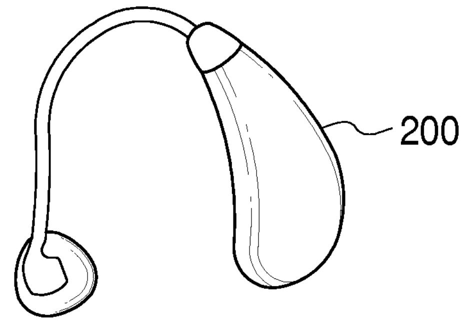
FIG. 2A is an image of an example hearing aid, which may be used for implementations described herein.
Figure 2B:
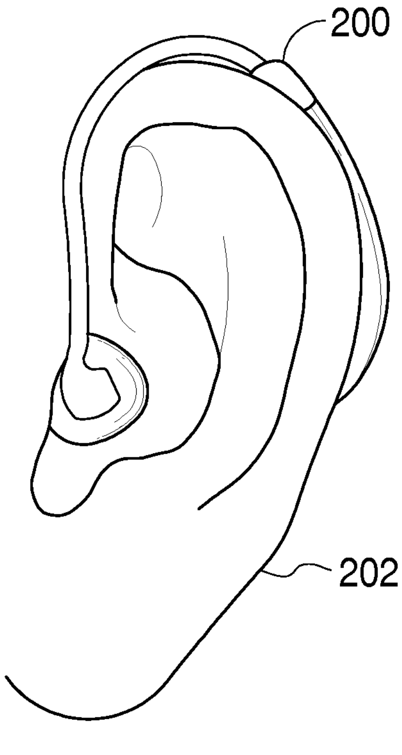
FIG. 2B is an image of a hearing aid worn on an ear, according to some implementations.

FIG. 2A is an image of an example hearing aid 200, which may be used for implementations described herein. FIG. 2B is an image of hearing aid 200 worn on an ear 202, according to some implementations. As shown, hearing aid 200 is worn on the exterior of ear 202 and wraps around the top of ear 202. In various implementation, the hearing aid receiver inserts into the canal of an ear.

Figure 3A:
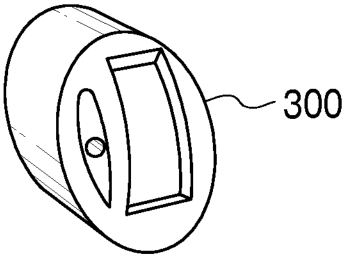
FIG. 3A is an image of an example hearing aid, which may be used for implementations described herein.
Figure 3B:
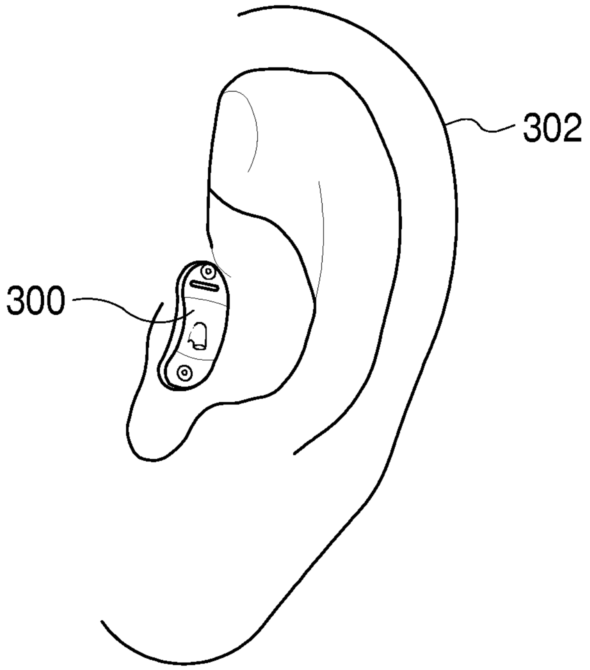
FIG. 3B is an image of a hearing aid worn in the canal of an ear, according to some implementations.

FIG. 3A is an image of an example hearing aid 300, which may be used for implementations described herein. FIG. 3B is an image of hearing aid 300 worn in the canal of an ear 302, according to some implementations. As shown, hearing aid 300 being inserted in the canal of ear 302 is less visible. The hearing aids shown in FIGS. 2A, 2B, 3A, and 3B are example implementations of hearing aid hardware. The particular types of hearing aid hardware may vary, depending on the implementation.

Figure 4:
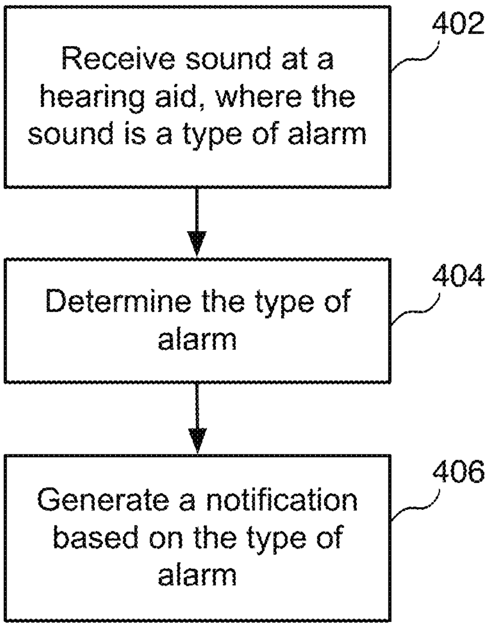
FIG. 4 is an example flow diagram for facilitating a user in hearing alarms and other sounds via a hearing aid, according to some implementations.

FIG. 4 is an example flow diagram for facilitating a user in hearing alarms and other sounds via a hearing aid, according to some implementations. Referring to both FIGS. 1 and 4, a method is initiated at block 402, where a system such as system 102 receives sound at a hearing aid. In various implementations described herein, the sound is an alarm. While various implementations are described herein in the context of alarm sounds. The sound may refer to any sound that may require the attention of the user wearing the hearing aid.

In various implementations, a hearing aid such as hearing aid 100 detects sounds including very faint and almost imperceptible sounds that a user might not notice. In various implementations, example sounds detected and received by hearing 100 may include a fire alarm, a carbon monoxide alarm, a chime/alarm of a washing machine or dryer finishing a cycle, a sound of a microwave finishing a cook cycle, a tea kettle whistling, a fire truck siren, a police siren, an emergency alert message, a car honking, a user's car alarm going off, a crying baby, a dog barking, a cat meowing, a knock at the door, a doorbell, sound of a motor, breaking glass, a security alarm, a splash (e.g., if kids are around a pool), a crash, a moan, crying, a shriek, the person's name, a user's cell phone ring or chime, etc. These are example sounds, and hearing aid 100 may detect other types of sounds.

At block 404, the system determines the type of alarm based on the sound of the alarm. In various implementations, the system may be configured to listen for specific types of alarms (e.g., fire alarm, a carbon monoxide alarm, etc.) that the user deems important and might not hear otherwise. The system may enable such sounds to be user-configurable via a software application on a device such as a mobile device that controls the hearing aid. In various implementations, the system may detect and distinguish novel sounds and record samples of such sounds. The system may then analyze the sounds locally and/or send the sounds over the Internet for further processing and analysis.

At block 406, the system generates a notification based on the type of alarm. In various implementations, the system generates and/or provides the in-ear announcement during a moment that is based on one or more predetermined notification policies. For example, in various implementations, a predetermined policy may be for the system to generate a notification based on a degree of urgency. In some implementations, a predetermined notification policy may be to deliver urgent messages immediately. For example, the system may determine that a particular sound is a fire alarm, which has a high degree of urgency. Once generated, the system may then provide the notification based on a notification policy, as described below.

In various implementations, a predetermined policy may be for the system to provide the notification at a time based on a degree of urgency. In various implementations, the system may enable the user to configure the system to provide urgent alarms immediately. In the example of a fire alarm, the system may provide the notification to the user immediately so that the user may take immediate action (e.g., vacating the premises, calling the fire department, etc.).

In some implementations, a predetermined announcement policy may be to deliver non-urgent messages at a delayed time (e.g., on the hour, during conversation breaks, etc.). For example, the system may determine that a particular sound is the sound of a dryer, which may have a low degree of urgency. In various implementations, the system may enable the user to configure the system to provide less urgent alarms immediately or in a delayed manner. With the example of an alarm indicating that a dryer cycle has been completed, the system may provide the notification to the user immediately if so desired by the user.

In some implementations, a predetermined announcement policy may be for the system to provide a notification when the hearing aid is not detecting any other sounds (e.g., conversations, etc.). For example, if the user is in a conversation with another person, the system may wait for a break in the conversation to deliver a particular alarm (e.g., a non-urgent alarm, etc.). In another example, the system may provide the notification on the next hour. The particular delay may vary, depending on the particular implementation.

In various implementations, a predetermined announcement policy may be for the system to estimate a distance of a given alarm sound. For example, an in-house fire alarm may be louder and thus estimated to be closer in proximity. The system may assign a higher degree of urgency to the fire alarm, and deliver the alarm and/or notification of the alarm accordingly (e.g., immediately). In another example, a fire truck siren may be quieter and thus estimated to be farther away. The system may assign a lower degree of urgency to the fire truck siren, and either deliver the alarm and/or notification of the alarm accordingly (e.g., delayed, indicated as not urgent, etc.).

In various implementations, the system reproduces the alarm at a speaker of the hearing aid. In various implementations, the system may raise the sound level of the alarm to a degree that is greater than other non-alarm sounds. The reproduced alarm may be simply greater or substantially greater than other sounds in order to successfully alert the user in a timely manner. In some implementations, the alarm sound may be reproduced in that the alarm sound is simply amplified. In some implementations, the alarm sound may be reproduced in that the alarm sound is recorded and then reproduced immediately or at a delayed time.

In various implementations, the notification is a second alarm that is derived from the alarm. For example, rather than amplifying or recording a given sound or alarm, the system may determine the type of alarm and generate a second alarm the represents the initial alarm. For example, if the system determines that the alarm is a fire alarm, the system may generate a second alarm that is a verbal announcement (e.g., "Fire!", "Evacuate! Fire!", etc.). This is an example where the notification is an audible message.

In various implementations, the system may provide the user with a glossary of sounds that the user may assign to particular types of sounds detected. The system may also enable the user to customize verbal messages to assign to particular types of sounds. For example, where the alarm is a microwave, the system may generate an appropriate second alarm that is also a verbal announcement (e.g., "Food is ready.", etc.). Alternatively, for any given type of alarm, the system may generate a second alarm that is a special sound. For example, a second alarm is for a microwave may be one type of sound (e.g., a ding sound). A second alarm for a doorbell may be another type of sound (e.g., a door bell sound).

In various implementations, the notification includes haptic feedback. For example, the system may be used with a motion and/or direction sensor. If the sensor is worn while the user is sleeping, the hearing aid worn by the user may wake up the person using haptic feedback (e.g., vibrations, pulses, etc.), which may be optionally combined with sound in order to wake the user up and enable the user to deal with an urgent situation.

In another example, the system may be configured to respond to a person's name. The person's name could be that of the user/wearer of the hearing aid. For example, if another person is calling out to the user of the hearing aid, the system will detect the user's name. The system may either amplify the user's name, or may produce a sound corresponding to the user's name in order to get the user's attention. The system may use artificial intelligence and machine learning to be trained to the person's name. Other detectable names are also possible. For example, the user of the hearing aid may want to hear if another user is calling another person's or pet's name for various reasons.

In some implementations, the system may attenuate or filter particular sounds that might not be important for the user to hear. For example, the system may attenuate background noise such as wind, traffic, etc. This enables the user to more easily distinguish between important sounds (e.g., alarms, notifications, announcements, etc.) from less important sounds (e.g., wind, traffic, etc.). The system may utilize any suitable frequency attenuation or noise cancelation techniques.

In some implementations, where the user is wearing a hearing aid in both ears, the system may deliver alarms, notifications, announcements, etc. to the user in the hearing aid of one ear and not the other hearing aid. This enables the system to deliver different types of information simultaneously. In such scenarios, the system may increase the volume of alarms, notifications, and announcements to be at higher level than other ambient sounds.

As indicated above, the system may establish communication between the hearing aid and a mobile device, and also access an Internet via the mobile device. As such, the system enables the hearing aid to send and receive data to and from the Internet via the mobile device. This is beneficial in that the hearing aid may utilize the power and other resources of the mobile device.

In some implementations, the hearing aid if tethered to a mobile device and to the Internet may facilitate the mobile device receiving emergency broadcast system alerts, such as evacuation notices in natural disasters that could be sent to the hearing aid. Also, in some implementations, the hearing aid may be configured to hear a specific safe word (e.g., "Help!", etc.). Such a safe word may trigger a call to emergency services via the mobile device (e.g., smart phone, etc.). This may be the case where the user falls and is unable to make it to a phone to call emergency services.

Although the steps, operations, or computations may be presented in a specific order, the order may be changed in particular implementations. Other orderings of the steps are possible, depending on the particular implementation. In some particular implementations, multiple steps shown as sequential in this specification may be performed at the same time. Also, some implementations may not have all of the steps shown and/or may have other steps instead of, or in addition to, those shown herein.

Implementations described herein provide various benefits. For example, implementations enable and facilitate a user in hearing alarms and other sounds via a hearing aid. Implementations described herein also determine types of alarms, and provide notifications to the user.

Figure 5:
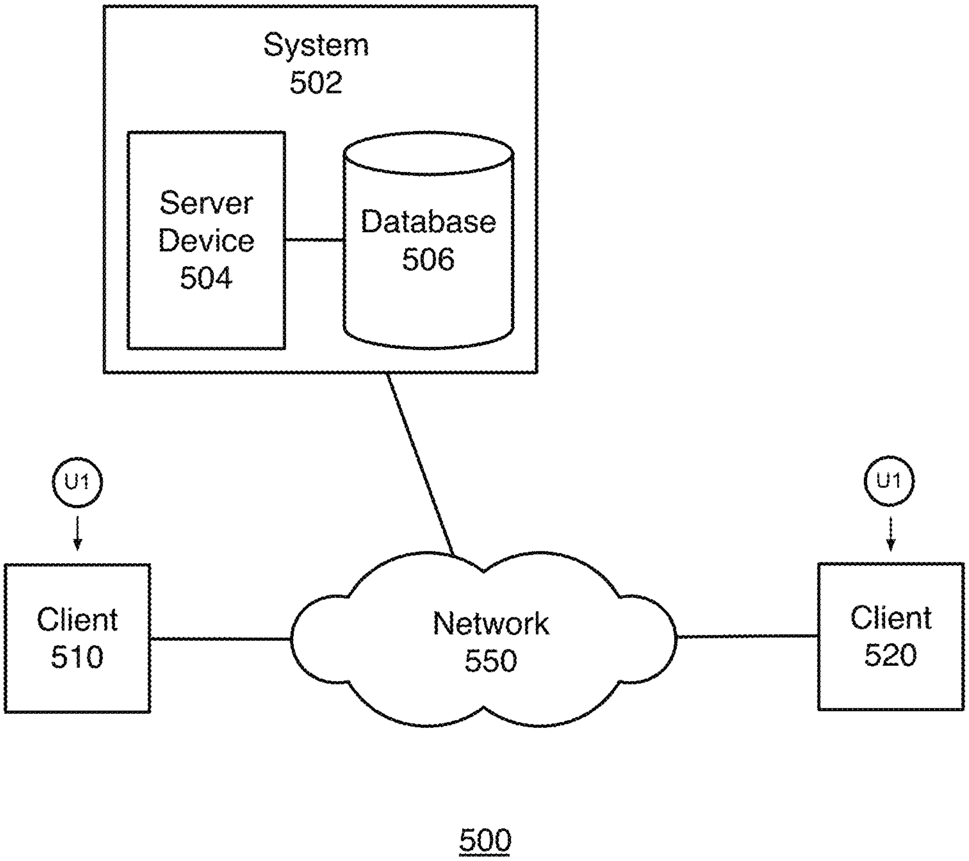
FIG. 5 is a block diagram of an example network environment, which may be used for some implementations described herein.

FIG. 5 is a block diagram of an example network environment 500, which may be used for some implementations described herein. In some implementations, network environment 500 includes a system 502, which includes a server device 504 and a database 506. For example, system 502 may be used to implement a system of a mobile device that communicates with the hearing aid described herein, as well as to perform implementations described herein.

Network environment 500 also includes client devices 510 and 520, which may represent two hearing aids worn by a user U1. For example, one client device may represent a hearing aid for a right ear, and the other client device may represent a hearing aid for a left ear. Client devices 510 and 520 may communicate with system 502 and/or may communicate with each other directly or via system 502. Network environment 500 also includes a network 550 through which system 502 and client devices 510 and 520 communicate. Network 550 may be any suitable communication network such as a Wi-Fi network, Bluetooth network, the Internet, etc.

While system 502 is shown separately from client devices 510 and 520, variations of system 502 may also be integrated into client device 510 and/or client device 520. This enables each of client devices 510 and 520 to communication directly with the Internet or another network.

For ease of illustration, FIG. 5 shows one block for each of system 502, server device 504, and network database 506. Blocks 502, 504, and 506 may represent multiple systems, server devices, and network databases. Also, there may be any number of client devices. In other implementations, environment 500 may not have all of the components shown and/or may have other elements including other types of elements instead of, or in addition to, those shown herein.

While server device 504 of system 502 performs implementations described herein, in other implementations, any suitable component or combination of components associated with system 502 or any suitable processor or processors associated with system 502 may facilitate performing the implementations described herein.

Figure 6:
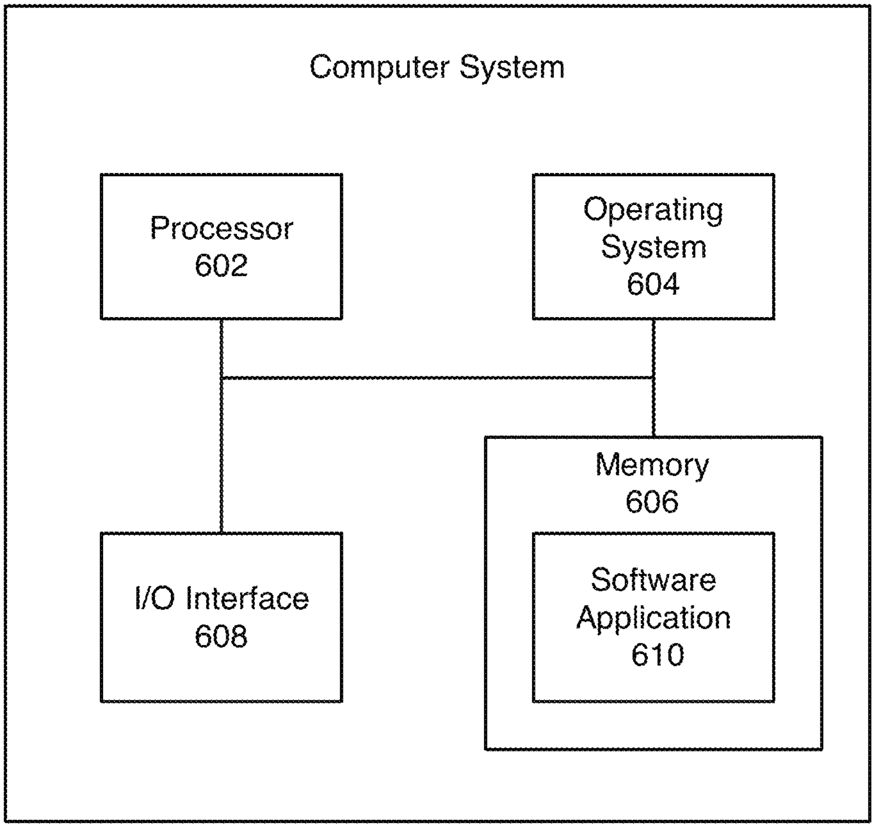
FIG. 6 is a block diagram of an example computer system, which may be used for some implementations described herein.

FIG. 6 is a block diagram of an example computer system 600, which may be used for some implementations described herein. For example, computer system 600 may be used to implement server device 504 of FIG. 5 and/or system 102 of FIG. 1, as well as to perform implementations described herein. In some implementations, computer system 600 may include a processor 602, an operating system 604, a memory 606, and an input/output (I/O) interface 608. In various implementations, processor 602 may be used to implement various functions and features described herein, as well as to perform the method implementations described herein. While processor 602 is described as performing implementations described herein, any suitable component or combination of components of computer system 600 or any suitable processor or processors associated with computer system 600 or any suitable system may perform the steps described. Implementations described herein may be carried out on a user device, on a server, or a combination of both.

Computer system 600 also includes a software application 610, which may be stored on memory 606 or on any other suitable storage location or computer-readable medium. Software application 610 provides instructions that enable processor 602 to perform the implementations described herein and other functions. Software application 610 may also include an engine such as a network engine for performing various functions associated with one or more networks and network communications. The components of computer system 600 may be implemented by one or more processors or any combination of hardware devices, as well as any combination of hardware, software, firmware, etc.

For ease of illustration, FIG. 6 shows one block for each of processor 602, operating system 604, memory 606, I/O interface 608, and software application 610. These blocks 602, 604, 606, 608, and 610 may represent multiple processors, operating systems, memories, I/O interfaces, and software applications. In various implementations, computer system 600 may not have all of the components shown and/or may have other elements including other types of components instead of, or in addition to, those shown herein.

Although the description has been described with respect to particular implementations thereof, these particular implementations are merely illustrative, and not restrictive. Concepts illustrated in the examples may be applied to other examples and implementations.

In various implementations, software is encoded in one or more non-transitory computer-readable media for execution by one or more processors. The software when executed by one or more processors is operable to perform the implementations described herein and other functions.

Any suitable programming language can be used to implement the routines of particular implementations including C, C++, C #, Java, JavaScript, assembly language, etc. Different programming techniques can be employed such as procedural or object oriented. The routines can execute on a single processing device or multiple processors. Although the steps, operations, or computations may be presented in a specific order, this order may be changed in different particular implementations. In some particular implementations, multiple steps shown as sequential in this specification can be performed at the same time.

Particular implementations may be implemented in a non-transitory computer-readable storage medium (also referred to as a machine-readable storage medium) for use by or in connection with the instruction execution system, apparatus, or device. Particular implementations can be implemented in the form of control logic in software or hardware or a combination of both. The control logic when executed by one or more processors is operable to perform the implementations described herein and other functions. For example, a tangible medium such as a hardware storage device can be used to store the control logic, which can include executable instructions.

Particular implementations may be implemented by using a programmable general purpose digital computer, and/or by using application specific integrated circuits, programmable logic devices, field programmable gate arrays, optical, chemical, biological, quantum or nanoengineered systems, components and mechanisms. In general, the functions of particular implementations can be achieved by any means as is known in the art. Distributed, networked systems, components, and/or circuits can be used. Communication, or transfer, of data may be wired, wireless, or by any other means.

A "processor" may include any suitable hardware and/or software system, mechanism, or component that processes data, signals or other information. A processor may include a system with a general-purpose central processing unit, multiple processing units, dedicated circuitry for achieving functionality, or other systems. Processing need not be limited to a geographic location, or have temporal limitations. For example, a processor may perform its functions in "real-time," "offline," in a "batch mode," etc. Portions of processing may be performed at different times and at different locations, by different (or the same) processing systems. A computer may be any processor in communication with a memory. The memory may be any suitable data storage, memory and/or non-transitory computer-readable storage medium, including electronic storage devices such as random-access memory (RAM), read-only memory (ROM), magnetic storage device (hard disk drive or the like), flash, optical storage device (CD, DVD or the like), magnetic or optical disk, or other tangible media suitable for storing instructions (e.g., program or software instructions) for execution by the processor. For example, a tangible medium such as a hardware storage device can be used to store the control logic, which can include executable instructions. The instructions can also be contained in, and provided as, an electronic signal, for example in the form of software as a service (SaaS) delivered from a server (e.g., a distributed system and/or a cloud computing system).

It will also be appreciated that one or more of the elements depicted in the drawings/figures can also be implemented in a more separated or integrated manner, or even removed or rendered as inoperable in certain cases, as is useful in accordance with a particular application. It is also within the spirit and scope to implement a program or code that can be stored in a machine-readable medium to permit a computer to perform any of the methods described above.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

Thus, while particular implementations have been described herein, latitudes of modification, various changes, and substitutions are intended in the foregoing disclosures, and it will be appreciated that in some instances some features of particular implementations will be employed without a corresponding use of other features without departing from the scope and spirit as set forth. Therefore, many modifications may be made to adapt a particular situation or material to the essential scope and spirit.

What is claimed is:

1. A system comprising:

one or more processors; and logic encoded in one or more non-transitory computer-readable storage media for execution by the one or more processors and when executed operable to cause the one or more processors to perform operations comprising:

receiving sound at a hearing aid, wherein the sound is an alarm;

determining a type of alarm;

generating a notification based on the type of alarm; and providing the notification at a time based on a degree of urgency.

2. The system of claim 1, wherein the generating of the notification is based on a degree of urgency.

3. The system of claim 1, wherein the logic when executed is further operable to cause the one or more processors to perform operations comprising reproducing the alarm at a speaker of the hearing aid.

4. The system of claim 1, wherein the notification is a second alarm that is derived from the alarm.

5. The system of claim 1, wherein the notification is an audible message.

6. The system of claim 1, wherein the notification comprises haptic feedback.

7. A non-transitory computer-readable storage medium with program instructions stored thereon, the program instructions when executed by one or more processors are operable to cause the one or more processors to perform operations comprising:

receiving sound at a hearing aid, wherein the sound is an alarm;

determining a type of alarm;

generating a notification based on the type of alarm; and providing the notification at a time based on a degree of urgency.

8. The computer-readable storage medium of claim 7, wherein the generating of the notification is based on a degree of urgency.

9. The computer-readable storage medium of claim 7, wherein the instructions when executed are further operable to cause the one or more processors to perform operations comprising reproducing the alarm at a speaker of the hearing aid.

10. The computer-readable storage medium of claim 7, wherein the notification is a second alarm that is derived from the alarm.

11. The computer-readable storage medium of claim 7, wherein the notification is an audible message.

12. The computer-readable storage medium of claim 7, wherein the notification comprises haptic feedback.

13. A computer-implemented method comprising:

receiving sound at a hearing aid, wherein the sound is an alarm;

determining a type of alarm;

generating a notification based on the type of alarm; and providing the notification at a time based on a degree of urgency.

14. The method of claim 13, wherein the generating of the notification is based on a degree of urgency.

15. The method of claim 13, further comprising reproducing the alarm at a speaker of the hearing aid.

16. The method of claim 13, wherein the notification is a second alarm that is derived from the alarm.

17. The method of claim 13, wherein the notification is an audible message.

* * * * *